US008095190B2

(12) United States Patent
Kim

(10) Patent No.: US 8,095,190 B2
(45) Date of Patent: Jan. 10, 2012

(54) METHOD AND APPARATUS FOR SEARCHING FOR A DIRECTORY ENTRY IN A MOBILE COMMUNICATION TERMINAL PHONE BOOK

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1344 days.

(21) Appl. No.: 11/412,560

(22) Filed: Apr. 26, 2006

(65) Prior Publication Data

US 2007/0037613 A1  Feb. 15, 2007

(30) Foreign Application Priority Data

Apr. 27, 2005  (KR) .................. 10-2005-0034950

(51) Int. Cl.
*H04M 1/00*  (2006.01)
(52) U.S. Cl. ................ 455/575.1; 455/563; 379/142.06
(58) Field of Classification Search .............. 455/563, 455/564, 566, 567, 569.1, 414.1, 415, 575.1, 455/466, 550.1; 379/142.04, 142.06
See application file for complete search history.

(56) References Cited

U.S. PATENT DOCUMENTS

| 4,852,146 | A  | * | 7/1989 | Hathcock et al. ............. 455/564 |
| 6,625,445 | B1 | * | 9/2003 | Ishigami ...................... 455/419 |
| 6,745,182 | B2 | * | 6/2004 | Josenhans ............................ 1/1 |
| 6,760,432 | B1 |   | 7/2004 | Wong et al. |
| 6,823,183 | B2 | * | 11/2004 | Narusawa ................. 455/412.1 |
| 6,944,472 | B1 | * | 9/2005 | Ishigami .................... 455/550.1 |
| 7,107,076 | B2 | * | 9/2006 | Lim .............................. 455/564 |
| 2002/0198027 | A1 | * | 12/2002 | Rydbeck ....................... 455/564 |
| 2003/0040327 | A1 | * | 2/2003 | Park ............................. 455/466 |
| 2004/0070634 | A1 |   | 4/2004 | Fordre |
| 2004/0203642 | A1 | * | 10/2004 | Zatloukal et al. .......... 455/414.1 |
| 2005/0086225 | A1 | * | 4/2005 | Cheng et al. ..................... 707/6 |
| 2008/0062938 | A1 | * | 3/2008 | Gil-soo et al. ................ 370/338 |

FOREIGN PATENT DOCUMENTS

| EP | 1193956 A2 | 4/2002 |
| EP | 1193956 A2 | 4/2002 |
| EP | 1672887 A1 | 6/2006 |
| JP | 2004/500766 | 1/2004 |
| WO | WO 2004/025936 A1 | 3/2004 |
| WO | WO2004/025936 A1 | 3/2004 |

OTHER PUBLICATIONS

Upp, Steven, "Automatic Telephone Number Retrieval," Motorola Technical Developments, Motorola Inc., Schaumburg, Illinois, vol. 19, Jun. 1, 1993, XP000361480.

* cited by examiner

*Primary Examiner* — Cong Tran
(74) *Attorney, Agent, or Firm* — Lee, Hong, Degerman, Kang & Waimey

(57) ABSTRACT

A method and apparatus for searching for a desired directory entry in phone book data of a mobile communication terminal is disclosed. A terminal phone book directory has one or more data entry fields such as hot-key, name, and phone number. Using the terminal keypad, the user enters a sequence of numbers, and according to the number of digits in the sequence of numbers, the terminal searches for directory entries wherein one or more data fields have a matching numerical sequence. All directory entries having a matching sequence are then displayed for the user to select the desired entry. Wild-card characters may be used in the sequence of numbers.

19 Claims, 3 Drawing Sheets

METHOD AND APPARATUS FOR SEARCHING FOR A DIRECTORY ENTRY IN A MOBILE COMMUNICATION TERMINAL PHONE BOOK

CROSS-REFERENCE TO RELATED APPLICATION

This application claims the benefit of Korean Patent Application No. 10-2005-0034950, filed on Apr. 27, 2005, which is hereby incorporated by reference as if fully set forth herein.

BACKGROUND OF THE INVENTION

The present invention relates to a mobile communication terminal, and more particularly to a method and apparatus for searching for a directory entry in a mobile communication terminal phone book.

In recent times, with the increasing development of information communication technologies, information and communication environments have changed quickly. Particularly, mobile communication terminals ("terminals") are now considered requisites for modern society, and are widely used throughout the world. With the increasing demands of users due to widespread use of the terminals, several functions (e.g., a voice message function, a SMS function, and a phone book function, etc.) have been added to the general voice call function terminals.

The phone book function for use in a conventional terminal will be described with reference to FIG. 1. A terminal phone book is a searchable list of directory entries, wherein each entry may have information stored in one or more of several fields. Typical fields in a terminal phone book entry are a hot key, a name, and a phone number, although additional fields may be present.

If a user selects a phone-book menu using a button on an input pad of a terminal, a display screen for searching for a directory entry is displayed as shown in FIG. 1.

The user enters a desired sub-menu from among a plurality of sub-menus (e.g., a search menu using a hot key, a search menu using a name, and a search menu using a phone number, etc.), and searches for a directory entry according to the corresponding sub-menu. Here, a hot key means a shortcut key such as a speed dial number pre-assigned to a specific directory entry.

In other words, the terminal phone book function can search for an entry using only one of the sub-menus, such that the user must manually press a button corresponding to one of the sub-menus to search for a desired phone number in the phone book. In addition, if the user fails to search for a directory entry using a single sub-menu, the user must close the sub-menu, and must visit other sub-menus by pressing or clicking other buttons corresponding to other sub-menus, resulting in greater inconvenience of the user.

SUMMARY OF THE INVENTION

Accordingly, the present invention is directed to a method and apparatus for searching for a directory entry in a terminal phone book that substantially obviates one or more problems due to limitations and disadvantages of the related art.

An object of the present invention is to provide a method and apparatus for more conveniently searching for a directory entry in a terminal phone book than in the conventional art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof and the appended drawings.

To achieve these objects and other advantages and in accordance with the purpose of the invention, as embodied and broadly described herein, a method for searching for an entry in a terminal phone book comprises: a) receiving a sequence of numbers from a user; and b) searching for at least one directory entry having the sequence of numbers in at least one directory entry field, the directory entry fields comprising hot-key, name, and phone number.

In another aspect of the present invention, an apparatus is provided for searching a terminal comprising: a key entry unit for receiving a sequence of numbers from a user; a database unit for storing phone book entries wherein each directory entry comprises at least one of a hot-key field, a name field, and a phone-number field; and a search controller for searching the data base for at least one directory entry field.

In accordance with the present invention, the apparatus and method can simultaneously search for a directory entry in a variety of fields contained in a terminal phone book directory.

The foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Figure 1:
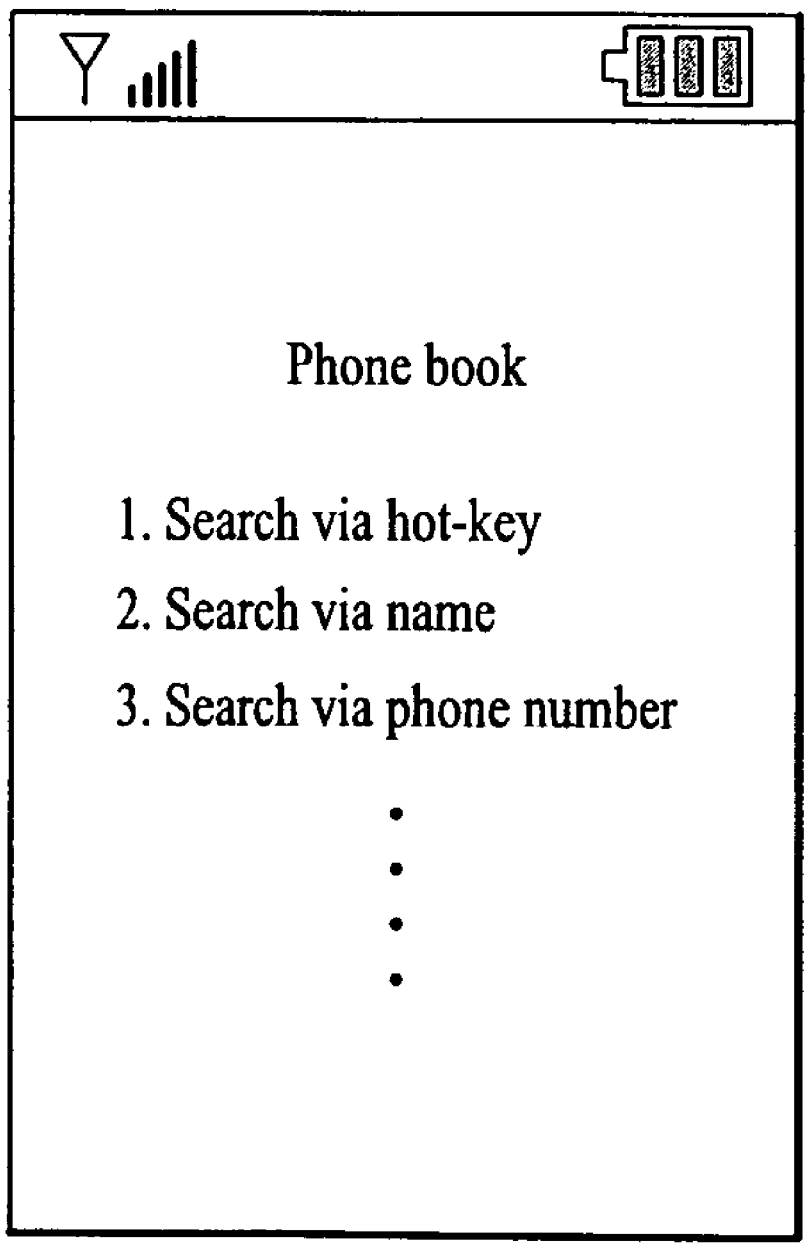
FIG. 1 shows a phone-book menu of a conventional mobile communication terminal.
Figure 2:
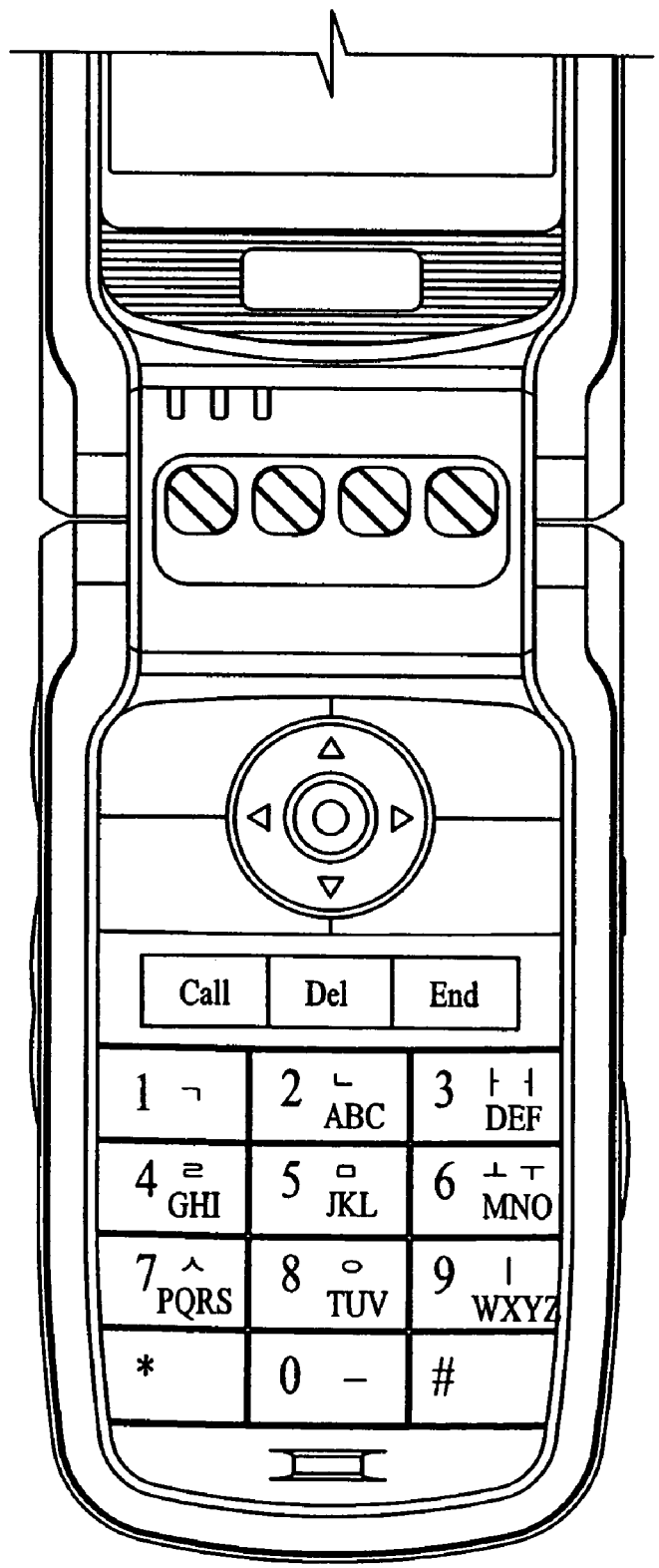
FIG. 2 shows a terminal keypad for receiving a number sequence according to an embodiment of the present invention.

A keypad for inputting a sequence of numbers or letters will be described with reference to FIG. 2. A user can enter a desired number or character via a number button contained in the terminal keypad shown in FIG. 2. The relationship between English letters and number buttons is shown in the following Table 1:

TABLE 1

| Number | English letter |
|---|---|
| 1 | |
| 2 | A, B, C |
| 3 | D, E, F |
| 4 | G, H, I |

TABLE 1-continued

| Number | English letter |
|---|---|
| 5 | J, K, L |
| 6 | M, N, O |
| 7 | P, Q, R, S |
| 8 | T, U, V |
| 9 | W, X, Y, Z |
| 0 | |

The relationship between numbers and English letters can be varied according to different manufacturing companies or different models of terminals. The relationship shown in Table 1 is disclosed for illustrative purposes of the present invention, and the present invention is not limited to the above-mentioned example. The terminal keypad may also have other language characters besides English letters, but English letters are used for the present invention for the convenience of description.

Figure 3:
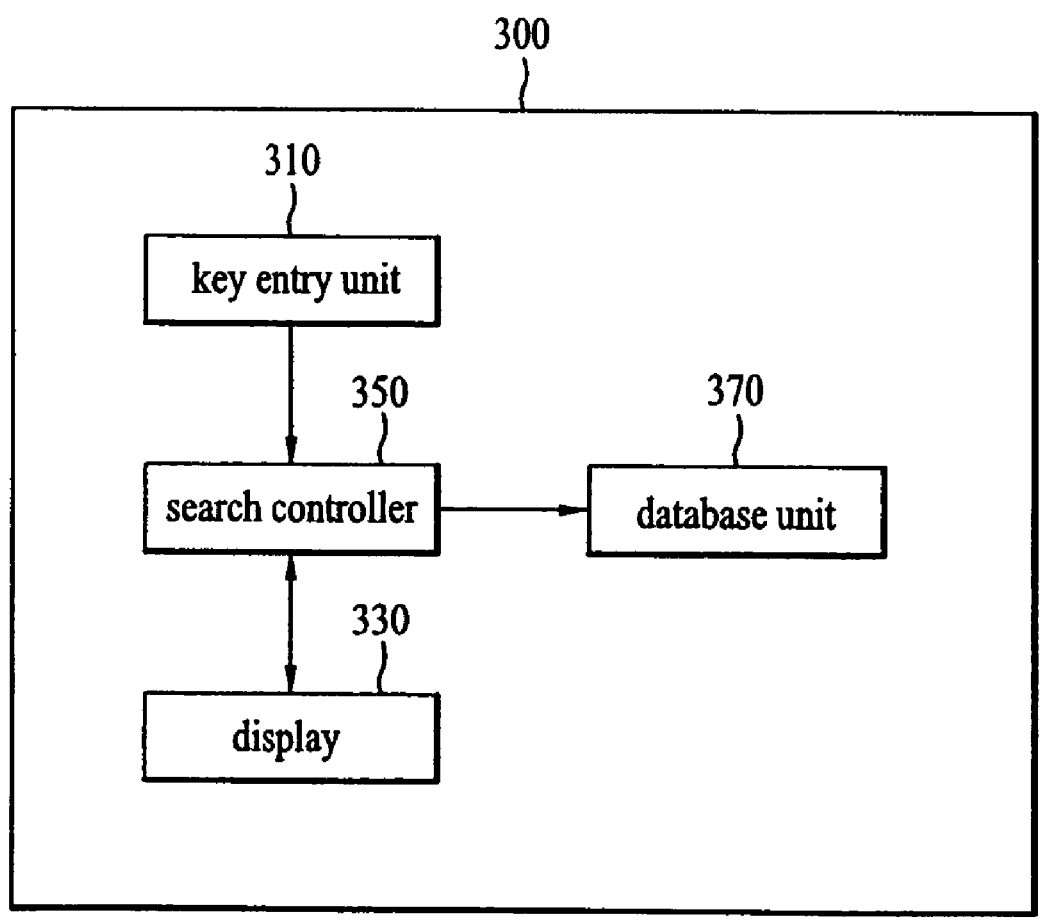
FIG. 3 is a block diagram illustrating an apparatus for searching for a desired directory entry in a terminal phone book according to an embodiment of the present invention.

FIG. 3 is a block diagram illustrating an apparatus for searching for desired data in a terminal phone book according to an embodiment of the present invention.

Referring to FIG. 3, the apparatus for searching for desired data in a phone book 300 according to the present invention includes: a key entry unit 310 equipped with a terminal keypad (see FIG. 2); a database unit 370 for storing phone-book data; a search controller 350 for searching for a directory entry in the database unit 370; and a display 330 for displaying the results of the search.

The phone-book data stored in the database unit 370 has at least one field from among several categories of data (e.g., a hot-key, a name, and a phone-number, etc.). For the convenience of description, the phone-book data is organized into three fields (i.e., a hot-key, a name, and a phone-number).

The search controller 350 may be implemented with a general Mobile Station Modem (MSM) of a mobile communication terminal, and may also be implemented by using an additional controller instead of or in conjunction with the general MSM.

If a user of the terminal having the above-mentioned phone-book search apparatus 300 enters a sequence of numbers using a standby screen image or a phone-book search screen image in order to search for a directory entry, the phone-book search apparatus 300 searches for the directory entry in the hot-key, the name, and/or the phone-book field according to the number of digits contained in the sequence of numbers. The user indicates the sequence of numbers is complete by pressing a special key, for example the center button in the navigation key, to initiate a search.

Searching for a directory entry is processed according to the number of digits of the sequence of number and is described as follows.

However, although the present invention assumes that the search object category scope changes according to the number of digits in the sequence of numbers, it should be noted that the example is disclosed only for illustrative purposes, and is applicable to other examples as required.

A) First Example in which a Sequence of Numbers is One or Two:

If a sequence of one or two numbers (e.g., "3" or "15") is provided to the key entry unit 310 to search for a directory entry, the search controller 350 searches for the directory entry only in the hot-key field of the phone-book data in the database unit 370.

If a user enters only one number (e.g., "3"), the search controller 350 searches for a directory entry assigned to a hot key corresponding to the number "3". If the search controller 350 retrieves the directory entry, the retrieved directory entry is displayed on the display 330. The user recognizes the retrieved directory entry, and presses a "Call" button to initiate the call.

The sequence of numbers may include a wild-card character acting as a meta character replacing a single number digit. The wild-card character is indicative of a character capable of replacing any single digit during the search. Preferably, the wild-card character may be set to "*" and/or "#" contained on the terminal keypad.

If the wild-card character substitutes for a single number, the search controller 350 searches for at least one directory entries party assigned to a single-digit hot key (i.e., a hot key of 1, 2, 3, 4, 5, 6, 7, 8, or 9), such that the directory entries are displayed. The user can select one of the directory entries by using up/down arrows ↑ and ↓ (See FIG. 2) on the terminal keypad, and can initiate a call to the selected directory entry.

If a user enters a sequence of numbers having two numbers (e.g., "15"), the search controller 350 searches for a directory entry assigned to a hot key corresponding to the sequence "15" from among the phone-book data of the database unit 370 in only the hot-key field. If the search controller 350 retrieves the directory entry, the retrieved directory entry is displayed on the display 330. The user recognizes the retrieved directory entry, and presses a "Call" button to initiate a call.

In the meantime, the sequence of numbers may include the wild-card character in the same manner as described above. For example, if a user enters a specific number sequence "1#", the search controller 350 searches for all the called parties assigned to hot keys of 10 to 19 in the hot-key field. The retrieved directory entries are displayed on the display 330 for the convenience of the user. Then, the user can select one of the directory entries using up/down arrows ↑ and ↓ (See FIG. 2) to select a directory entry and initiate a call.

B) Second Example in which a Sequence of Numbers is Three:

If a sequence of three numbers (e.g., "278") is provided to the key entry unit 310 to search for a directory entry, the search controller 350 searches for the directory entry in the hot-key and name fields of the phone-book data of the database unit 370.

In more detail, the search controller 350 first searches for a called party assigned to a hot key corresponding to the sequence of numbers in the hot-key field.

Based on the relationship between numbers and letters shown in Table 1, the search controller 350 searches for a directory entry having a name beginning with any English letter sequentially corresponding to individual numbers of the sequence of numbers in the name field. For example, the user enters a numeral sequence "278", the number "2" corresponds to "A", "B", and "C", the number "7" corresponds to "P", "Q", "R", and "S", and the number "8" corresponds to "T", "U", and "V", such that all the directory entries having English names such as "Bruce" and "Astro" will be retrieved by the search controller 350.

Needless to say, the sequence of numbers may also include the wild-card character in the same manner as described above, and a detailed description will be omitted for the convenience of description.

If the search controller 350 retrieves at least one directory entry in the hot-key and name fields, the retrieved directory entries are displayed on the display 330. The user may select one of the directory entries using up/down arrows ↑ and ↓ (See FIG. 2), and can initiate a call.

C) Third Example in which a Sequence is Four or More Numbers:

If a sequence of numbers having four or more numbers is provided to the key entry unit 310 to search for a directory entry, the search controller 350 searches for the directory entry in the hot-key, name, and phone-number fields of the phone-book data of the database unit 370.

The search controller 350 searches first for a directory entry assigned to a hot key corresponding to the sequence of numbers.

Based on the relationship between numbers and letters shown in Table 1, the search controller 350 then searches for a directory entry having a name beginning with the English letter corresponding to the sequences of numbers in the name field, and a detailed description has been fully described in the above, and a further description will be omitted for convenience.

The search controller 350 further searches for a directory entry having a phone number corresponding to the sequence of numbers in the phone-number field.

Needless to say, the sequence of numbers may also include the wild-card character in the same manner as described above.

If the search controller 350 retrieves at least one directory entry in the hot-key, name, and phone-number fields, the retrieved directory entries are displayed on the display 330. The user selects any one of the directory entries using up/down arrows ↑ and ↓ (See FIG. 2), and can initiate a call.

As apparent from the above description, the method and apparatus for searching for a directory entry in phone-book data of a terminal according to the present invention can simultaneously search for a desired directory entry using a variety of fields (i.e., hot-key, name, and phone-number, etc.) when a user enters a sequence of numbers, such that the user can quickly and conveniently search for the directory entry in the phone book data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for searching for directory entries of a mobile communication terminal phone book, wherein each directory entry has at least one data field, the method comprising:
    receiving a sequence of at least one number; and
    searching for at least one directory entry having the sequence of at least one number in at least one data field of the at least one directory entry,
    wherein a number of the at least one data field in which the at least one directory entry is searched for is determined based upon a total number of digits in the sequence of at least one number received, and
    wherein a different number of the at least one data field is searched based upon the total number of digits in the sequence of at least one number received, the number of the at least one data field in which the at least one directory entry is searched for increasing as the total number of digits in the sequence of at least one number received increases.

2. The method of claim 1, wherein the sequence of at least one number is received via a keypad of the mobile communication terminal.

3. The method of claim 1, wherein each directory entry comprises at least two data fields among a hot-key data field, a name data field, and a phone number data field.

4. The method of claim 3, wherein the searching comprises comparing the sequence of at least one number to at least one data field, wherein the at least one data field is responsive to the number of digits in the sequence of at least one number received.

5. The method of claim 3, wherein:
    only the hot-key data field is searched when the total number of digits in the sequence of at least one number is one or two;
    only the hot-key and name data fields are searched when the total number of digits in the sequence of at least one number is three; and
    the hot-key, name, and phone number data fields are searched when the total number of digits in the sequence of at least one number is four or more.

6. The method of claim 1, wherein the sequence of at least one number includes at least one wild-card character.

7. The method of claim 6, wherein the at least one wild-card character signifies an arbitrary number in the sequence of at least one number at the position of the wild-card character, and wherein the wild-card character matches all numbers when searching one or more data fields.

8. The method of claim 6, wherein the at least one wild-card character is the character "*" or the character "#".

9. The method of claim 1, further comprising displaying all directory entries having the sequence of at least one number in one or more data fields.

10. An apparatus for searching a mobile communication terminal phone book, the apparatus comprising:
    a keypad for receiving a sequence of at least one number;
    a database unit for storing a phone book directory, wherein each entry of the directory has at least one data field; and
    a search controller for searching for at least one directory entry having the sequence of at least one number contained in at least one data field,
    wherein a number of the at least one data field in which the at least one directory entry is searched for is determined based upon a total number of digits in the sequence of at least one number received, and
    wherein a different number of the at least one data field is searched based upon the total number of digits in the sequence of at least one number received, the number of the at least one data field in which the at least one directory entry is searched for increasing as the total number of digits in the sequence of at least one number received increases.

11. The apparatus of claim 10, wherein each directory entry comprises at least two data fields among a hot-key data field, a name data field, and a phone-number data field.

12. The apparatus of claim 11, wherein the search controller searches at least one data field responsive to the number of digits in the sequence of at least one number received.

13. The apparatus of claim 11, wherein:
    only the hot-key data field is searched when the total number of digits in the sequence of at least one number is one or two;
    only the hot-key and name data fields are searched when the total number of digits in the sequence of at least one number is three; and
    the hot-key, name, and phone number data fields are searched when the total number of digits in the sequence of at least one number is four or more.

14. The apparatus of claim 10, wherein the sequence of at least one number includes at least one wild-card character.

15. The apparatus of claim 14, wherein the at least one wild-card character signifies an arbitrary number in the sequence of at least one number at the position of the wild-card character, and wherein the wild-card character matches all numbers when searching one or more data fields.

16. The apparatus of claim 14, wherein the at least one wild-card character is the character "*" or the character "#".

17. The apparatus of claim 10, further comprising a display for displaying all directory entries having the sequence of at least one number in one or more data fields.

18. A method for searching for directory entries of a mobile communication terminal phone book, wherein each directory entry has at least one data field, the method comprising:
receiving a sequence of at least one number; and
searching for at least one directory entry having the sequence of at least one number in at least one data field of the at least one directory entry,
wherein a number of the at least one data field in which the at least one directory entry is searched for is determined based upon a total number of digits in the sequence of at least one number received, and
wherein when each directory entry comprises at least two data fields, the method further comprises:
determining the total number of digits in the sequence of at least one number received; and
determining in which one or more of the at least two fields the at least one directory entry will be searched for based upon the determined total number of digits.

19. An apparatus for searching a mobile communication terminal phone book, the apparatus comprising:
a keypad for receiving a sequence of at least one number;
a database unit for storing a phone book directory, wherein each entry of the directory has at least one data field; and
a search controller for searching for at least one directory entry having the sequence of at least one number contained in at least one data field,
wherein a number of the at least one data field in which the at least one directory entry is searched for is determined based upon a total number of digits in the sequence of at least one number received, and
wherein when each director comprises at least two data fields, the search controller is configured to:
determine the total number of digits in the sequence of at least one number received; and
determine in which one or more of the at least two fields the at least one directory entry will be searched for based upon the determined total number of digits.

* * * * *